Patented Feb. 2, 1932

1,843,122

UNITED STATES PATENT OFFICE

WILLIS H. CARRIER, OF ESSEX FELLS, NEW JERSEY, ASSIGNOR TO CARRIER ENGINEERING CORPORATION, OF NEWARK, NEW JERSEY

LUBRICATING, SEALING AND THRUST BALANCING MEANS FOR COMPRESSORS AND THE LIKE

Original application filed February 26, 1926, Serial No. 90,848. Divided and this application filed November 3, 1928. Serial No. 317,029.

This invention relates to mechanism for use with rotary or centrifugal fluid compressors, vacuum pumps and the like, for lubricating and cooling the bearings for the compressor shaft, sealing the opening in the compressor casing through which the rotary compressor shaft passes and regulating or balancing the end thrust of the compressor shaft. The said mechanisms are particularly desirable for use with the compressors of refrigeration apparatus which operate on the vapors of volatile fluids at pressures below atmospheric pressure, but are applicable also to compressors and vacuum pumps for other purposes.

In the operation of compressors or vacuum pumps such as mentioned, it is important to prevent the leakage of vapor or gas from and of air into the compressor, and it is also desirable to provide a liquid seal which will prevent leakage of the air or gas into or out of the compressor through the compressor shaft opening with the minimum of friction when the compressor is in operation, and also to seal the shaft opening to prevent the leakage of air or gas therethrough when the compressor is shut down. Other considerations of importance are to prevent friction due to end thrust on the compressor shaft caused by the unbalanced pressure of the gas or vapor on the compressor rotor, and to reduce to the minimum the absorption or contamination of the vapor or gas being compressed and the lubricating and sealing liquid one by the other.

This application is a division of my copending application, Serial No. 90,848 filed Feb. 26, 1926 now Patent No. 1,721,614, issued July 23, 1929, and is concerned particularly with the sealing and thrust balancing features of the application.

One object of this invention is to produce a practical, efficient and reliable mechanism whereby the above mentioned results are attained.

Other objects of the invention are to provide an efficient liquid seal which will act without substantial friction to effectively seal the shaft opening during the operation of the compressor; also to combine with the liquid seal an efficient valve or device which acts automatically when the rotation of the compressor stops, to close or seal the shaft opening against the leakage of air or gas; also to provide means of simple and practical construction which balances the end thrust on the shaft and prevents friction incident thereto, and which preferably, in addition, acts automatically when the compressor is in operation to unseat the valve or closure device for the shaft opening and hold the same off of its seat so as to prevent friction between these parts while the compressor is in operation; and also to improve the construction and operation of sealing and thrust balancing means for rotary gas compressors or vacuum pumps in the other respects hereinafter described and set forth in the drawings.

Figure 1:
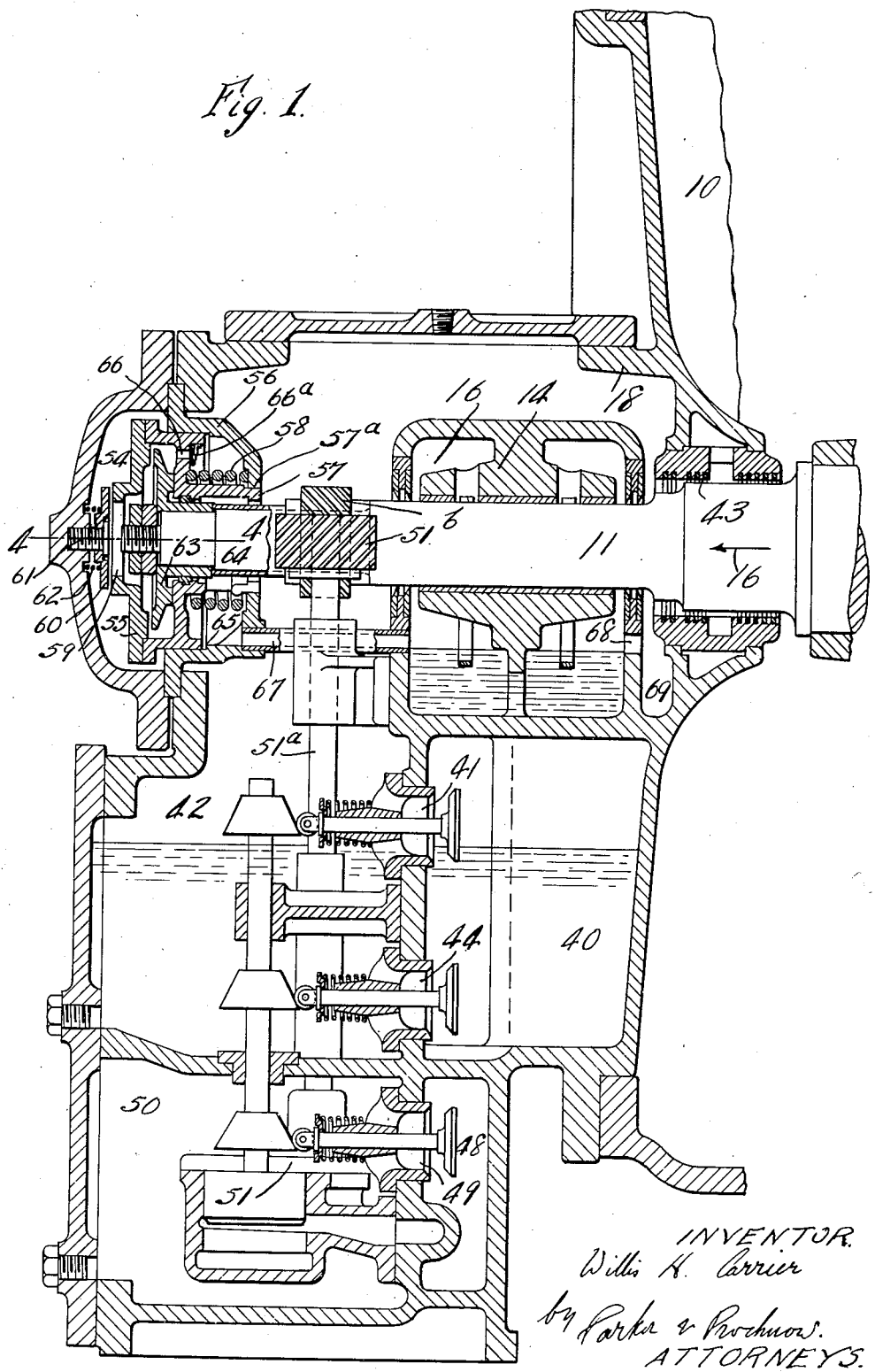
Figs. 1 and 2 are longitudinal, sectional elevations respectively of the suction and pressure portions of a centrifugal compressor provided with sealing and thrust balancing means embodying the invention.

10 represents the casing of a centrifugal compressor or vacuum pump and 11 the compressor shaft on which the rotors or impellers of the compressor (not shown) are mounted. The invention is not concerned with the construction of the compressor itself, which may be of any suitable construction, and therefore is not illustrated in the drawings. It is sufficient for the purpose of this invention to understand that according to the illustrated embodiment of the invention the compressor inlet or suction is at the lef hand end and the compressed fluid outlet or pressure chamber at the right hand end of the casing, as illustrated in Figs. 1, 2 and 3; that the impeller shaft extends out of the compressor casing at one end, preferably the pressure end of the compressor for connection to the driving motor or device, and is journalled in bearings 14 and 15 respectively at the suction and pressure ends of the compressor, and that the vapor or fluid being compressed exerts a pressure on the impeller which causes a thrust on the shaft toward the left or suction end of the compressor, as indicated by the arrow 16 in Fig. 1.

The bearings 14 and 15, which may be of any suitable construction, are preferably located in oil chambers 16 and 17 in the bottoms of which bodies of oil are maintained, and suitable lubricating rings or devices are provided which carry the oil to the bearings continuously during the operation of the compressor. The bearing 14 and its oil chamber at the suction end of the compressor are enclosed, as by a suitable housing 18 so that this bearing is subject to the suction or inlet pressure of the compressor, while the bearing 15 at the pressure end of the compressor may be, and preferably is located outside of the compressor casing so that this bearing is exposed to atmospheric pressure.

Figure 2:
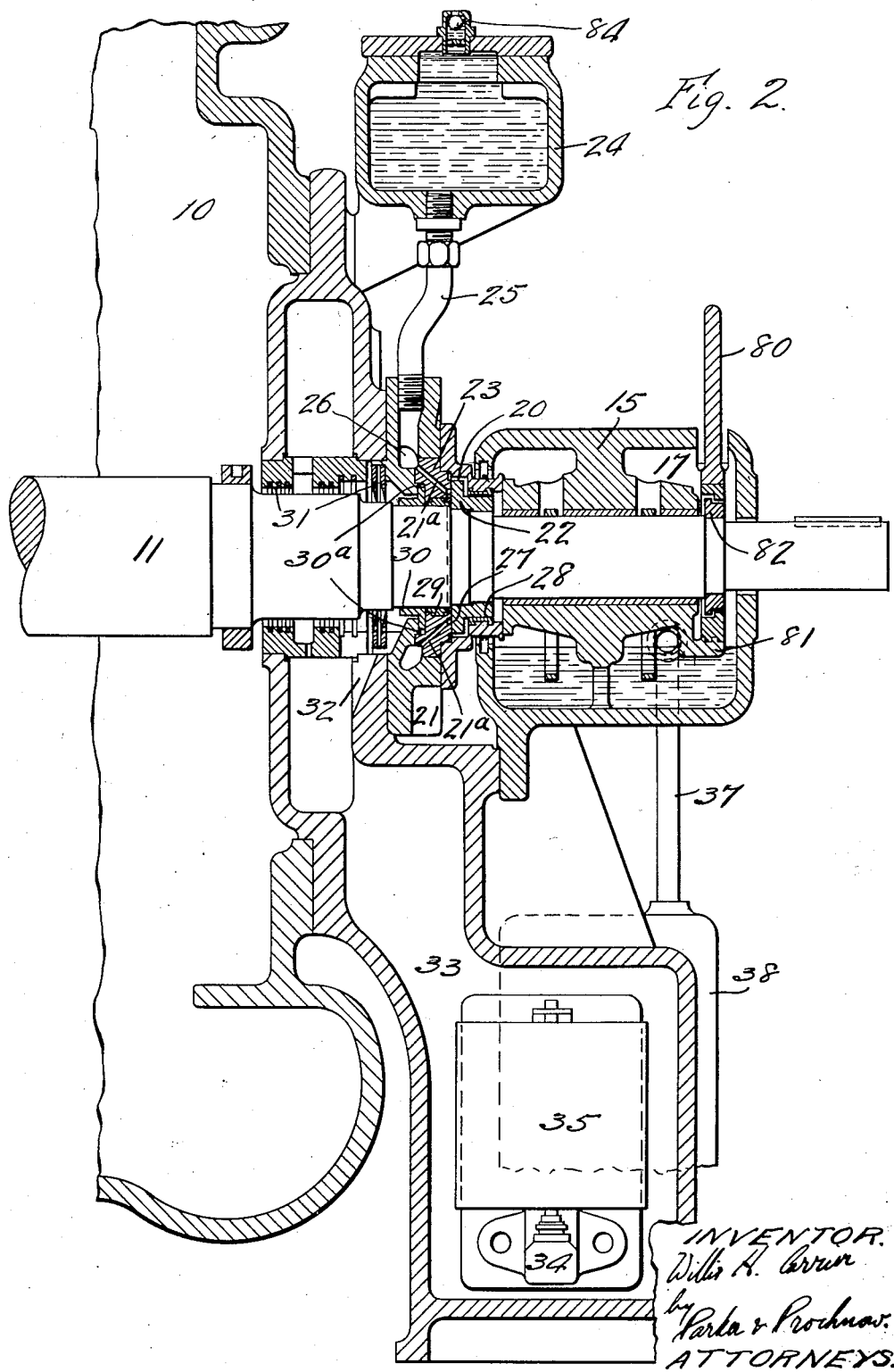
Figure 3:
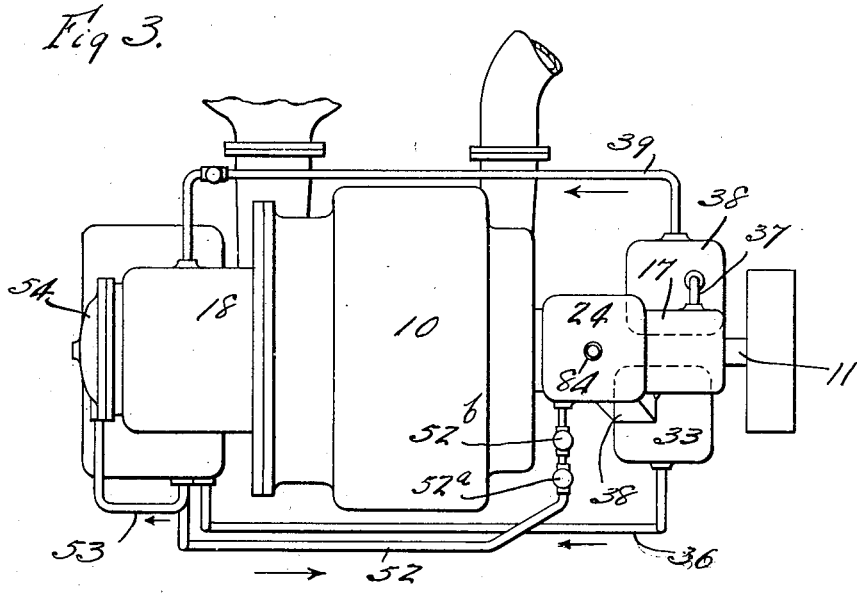
Fig. 3 is a diagrammatic plan view on a reduced scale, of the compressor and oil circulating system.

An annular liquid sealing chamber 20, Fig. 2, surrounds the shaft 11 at the pressure end of the compressor between the discharge chamber of the compressor and the shaft bearing 15, the sealing chamber being formed in a casing 21 of suitable construction secured to or formed on the compressor casing. Formed on or secured to the shaft 11, to rotate therewith, and located within the sealing chamber, is an annular valve or closure device 22. The inner end of this valve faces a sealing or seat ring 23 which is secured in or formed with the sealing casing 21, and as hereinfter explained, during the operation of the compressor, the valve 22 is held out of contact with this opposing seat 23 so as to maintain a definite clearance between these parts, and the sealing liquid or oil passes from a reservoir or reserve chamber 24 where it is maintained at a suitable constant pressure, say from five to ten pounds, to said clearance space between the valve 22 and seat 23, through a pipe or passage 25, a connecting annular passage 26 in the casing 21 and ducts 21a connecting the passage 26 to the annular groove 27 in the outer face of the seat ring 23. Part of the oil passes from this space through the sleeve or bushing 28 surrounding the valve hub to the adjacent bearing 15 so as to always maintain the requisite body of oil in the bearing lubricating chamber 17. Another portion of the oil escapes through the bushing 29 in the sealing ring 23 and past a loose packing ring 30 which is preferably of L-shape in longitudinal section. This ring has a close running fit on the shaft and is not secured so as to revolve with the shaft, but is free to play laterally with the shaft, due to any eccentricity of rotation of the shaft, in an annular cavity 30a in the sealing casing at the inner side of the sealing ring 23. The packing ring 30 also has a close sliding fit between the opposite end faces of the cavity 30a so that it may be held from rotation by the oil pressing it against the inner end face of the cavity 30a.

This packing ring 30 serves to restrict the leakage of oil past it along the shaft toward the compressor casing due to the difference between the external atmospheric pressure and the lower pressure in the pressure end of the compressor, which is under a partial vacuum corresponding to the vacuum in the condenser to which the compressed fluid is delivered by the compressor. The oil leaking past the loose packing ring 30 is stripped off of the shaft by suitable labyrinth packings 31 which prevent it from finding its way into the impeller chamber of the compressor, and the oil escapes from the labyrinths through a passage 32 to a trap 33 by which it is trapped back through a suitable pipe or passage 36 for return to the oil circulating pump. The trap 33 can be provided with a valve 34 actuated by a float 35, or can be of any other suitable type of trap. Also on the atmospheric side of the sealing device, the oil from the oil chamber for the bearing 15 discharges through an overflow pipe 37 to a second trap 38, hereinafter called the "atmospheric trap", which may be similar to the trap 33, and by which the oil is trapped back through a pipe or passage 39 for return to the oil pump. As explained in my said application Serial No. 90,848, the oil is returned to the oil circulating pump through a separating chamber 40 and a cooler 46. From the cooling chamber 46, the oil passes through a passage 48 and opening 49 into a pump chamber 50 in which an oil circulating pump 51 of any suitable construction is located.

This pump is driven so as to operate when the compressor is in operation. For instance, the pump shaft 51a, see Figs. 1 and 3, is connected by gears 51b to and driven by the compressor shaft 11.

The oil pump 51 delivers the oil through a suitable pipe or passage 52 provided with a check valve 52a and a pressure-reducing valve 52b to the oil reservoir 24 and maintains the required pressure therein, and this reservoir feeds the oil to the seal and bearing at the pressure end of the compressor. The oil is also delivered under pressure directly from the pump 51 through a suitable pipe or passage 53 to a thrust bearing chamber 54 which encloses the left hand end of the compressor shaft and also a thrust bearing and balancing device for the compressor shaft. The pressure in this chamber is maintained by the oil pump independently of the pressure on the oil reservoir, or reserve chamber 24, and the pressure in the chamber 54 depends on the amount of thrust exerted by the gas or vapor being compressed upon the unequal areas of the rotors of the compressor.

The thrust bearing and balancing device is preferably constructed as follows:

55 represents a hollow piston or member arranged to move axially of the compressor shaft in a cylindrical portion 56 of the chamber 54. This piston is provided with a tubular hub 57 which surrounds the compressor shaft and is guided in an opening 57a in the inner end of the chamber 54, and the piston is pressed outwardly or toward the left by a suitable spring 58, which as shown, surrounds the hub 57 between the piston and the inner end of the chamber 54. The outer end of the piston 55 is provided with an oil admission opening 59 adapted to be closed by a spring pressed valve 60 axially movable in the chamber 54 opposite the piston. As shown, this valve is slidably mounted on a headed stud 61, and the inward movement of the valve, which is moved inwardly by a spring 62, is limited by the head of the stud 61. Rigidly secured on the compressor shaft within the hollow piston 55 with its outer end facing and close to the outer end of the piston, is a disk 63, the hub of which slidably fits in an annular bushing or packing ring 64 in the hub of the piston. The inner side of the disk 63 is adapted to engage a stop or shoulder on the inner end wall of the hollow piston.

Figure 4:
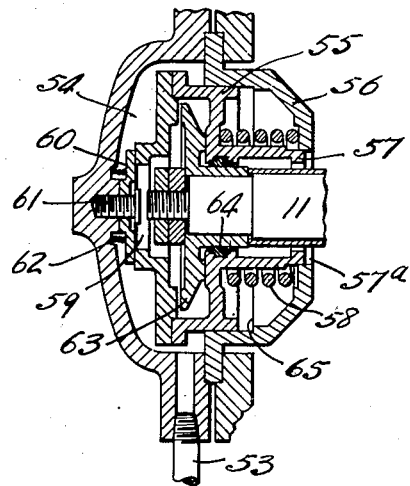
Fig. 4 is a horizontal section of the thrust bearing and balancing device on line 4—4, Fig. 1.

In the normal position of the parts when the compressor is not running, the hollow piston 55 is in its outer position shown in Fig. 4 to which it is moved by the spring 58, and the valve 60 closes the oil admission opening 59 to the interior of the piston. When the compressor starts up, the oil pump, which is geared thereto, forces oil into and creates a pressure in the thrust bearing chamber 54 from which there is then only a slight leakage escape as the admission opening 59 to the hollow piston is closed by the valve 60. The piston is moved inwardly by the oil pressure and the valve 60 moves with the piston for about one-half the travel of the piston when the valve is arrested by engagement with the head of the valve stud. At this point the sealing valve 22 at the pressure end of the compressor has begun to leave its seat or sealing ring 23. From this point on, the piston 55 is forced to the right until it is arrested by contact with the stop shoulder 65 at the inner end of the cylindrical piston cavity, when it will have moved a short distance preferably about 3/32″, and there will be a narrow opening of about 3/64″ between the admission valve 60 and the valve seat on the outer end of the piston to allow the oil to enter the interior of the hollow piston 55 and create a pressure against the thrust disk on the compressor shaft, whereby the thrust of the shaft is balanced by the oil pressure exerted against the disk. Since the feed of the oil is positive, and since the thrust on the shaft is always toward the suction end of the compressor, that is toward the left, in Fig. 1, the clearance between the disk 63 and the piston 55 determines the pressure which is required to counteract the thrust of the compressor rotors.

The piston 55 is provided, preferably at the upper portion of its inner end, with a hole 66 through which a regulated escape of the oil from the hollow piston occurs during the operation of the compressor. The escape of oil through the hole can be regulated or restricted as required, in any suitable way, as for instance, by furnishing the hole with a flap valve 66a which is closed by spring pressure so as to cause a limited back pressure in the hollow piston, but which is opened by the oil when a predetermined pressure is exceeded. This arrangement seals the disc chamber with oil and excludes the air, thus preventing frothing and vaporization of the oil otherwise caused by the rotation of the disc in a mixture of oil with air or gas. This is important in preventing the possibility of oil, foam and vapor being carried through the bearing labyrinths into the inlet of the compressor. It also keeps the oil free from contamination with air and gas in the pumping chamber which would otherwise cause trouble due to the oil pump "gasing" in failing to pump.

The oil escaping past or through the hollow piston flows in part to the oil chamber 16 for the bearing at the suction end of the compressor through a suitable pipe or passage 67, thus keeping this bearing cooled and always maintaining a fresh supply in the oil chamber. The oil overflows from this oil chamber 16 through a suitable opening 68 into the chamber 42 in the housing 18, from which the oil passes through the opening 44 in the lower part of the chamber into the separating chamber 40, from which the oil flows with the other oil in the chamber coming from the pressure side of the compressor to the oil cooler and oil pump.

When the compressor is shut down, the oil pump also stops, as before explained, and ceases to produce pressure, and the spring 58 then forces the piston 55, together with the compressor shaft 11 toward the left, as shown in the drawings, and brings the closure valve 22 at the pressure end of the compressor against its seat or sealing ring 23, thus producing a perfect oil sealed closure against atmospheric pressure from without into the compressor. A suitable hand device 80 is also preferably provided by which the shaft can be moved to exert still further pressure of the closure valve 22 against its seat and the accuracy of the automatic closure tested. This device 80 may be of any suitable construction, consisting, for example, of a screw or cam ring adapted to turn in a cooperating stationary bearing 81 and engaging a collar or flange 82 on the shaft for moving the shaft towards the left.

The oil reservoir 24 is provided with an air relief valve or device 84 consisting, for example, of a ball adapted to be seated by the oil rising within the reservoir and adapted to be opened by atmospheric pressure, so that when the machine is shut down this valve acts as a vacuum breaker, and no vacuum can be brought on the oil reservoir 24, which is then opened to the atmosphere. At this time the oil is prevented from discharging from the reservoir by the closure valve 22, which seats tightly against the sealing ring 23 and closes the discharge passages from the reservoir leading to the valve seat.

The reducing valve 52b is used in this system so that there may not be an excessive pressure on the reserve oil chamber 24 and the sealing member. Not more than from five to ten pounds pressure is required. More pressure than this causes an excessive amount of oil to flow and also causes foaming. If an ordinary thrust bearing is used at 63, the valve 52b becomes a relief valve which merely maintains between five and ten pounds pressure on the entire system.

Of course, the sealing device is not necessarily moved off the seat by means of the oil pressure, but could be moved off by other means such as a centrifugal device.

I claim as my invention:

1. In a fluid compressor having a rotary shaft extending through an opening in the compressor casing, the combination of a liquid sealing device for said shaft opening comprising an annular sealing chamber surrounding said shaft, and an annular member which rotates with the shaft in said sealing chamber, means for maintaining sealing liquid in said sealing chamber, and a packing ring surrounding and having a running fit on said shaft in an annular cavity communicating with said sealing chamber, said shaft being adapted to rotate in said packing ring and said ring having a laterally sliding fit in said annular cavity whereby the ring can shift laterally in said cavity as the shaft rotates.

2. In a fluid compressor having a rotary shaft extending through an opening in the compressor casing, the combination of a liquid sealing device for said shaft opening comprising an annular sealing chamber surrounding said shaft and an annular member which rotates with the shaft in said sealing chamber, means for supplying sealing liquid under pressure to said sealing chamber, and a packing ring surrounding said shaft in an annular cavity communicating with said sealing chamber and located between the same and the impeller chamber of the compressor, said shaft being adapted to rotate in said packing ring and said ring having a sliding fit in said annular cavity whereby the ring can shift laterally in said cavity as the shaft rotates.

3. In a fluid compressor having a rotary shaft extending through an opening in the compressor casing, the combination of a valve and valve seat which surround said shaft and cooperate to form a closure for said shaft opening when the compressor is not running, said valve being held off of its seat when the compressor is running, mechanism which forms a liquid seal for said shaft opening when the compressor is running, and a packing ring surrounding said shaft in an annular cavity communicating with said liquid seal, said shaft being adapted to rotate in said packing ring and said ring having a loose fit in said annular cavity whereby the ring can shift laterally in the cavity as the shaft rotates.

4. In a fluid compressor having a rotary shaft extending through an opening in the compressor casing, the combination of a valve and valve seat which surround said shaft and cooperate to form a closure for said shaft opening when the compressor is not running, said valve being held off of its seat when the compressor is running, mechanism which maintains a sealing liquid under pressure between said valve and valve seat and forms a liquid seal for said shaft opening when the compressor is running, and a packing ring surrounding said shaft in an annular cavity communicating with the space between said valve and valve seat and located between said valve seat and the impeller chamber of the compressor, said shaft being adapted to rotate in said packing ring and said ring having a sliding fit in said annular cavity whereby the ring can shift laterally in the cavity as the shaft rotates.

5. In a fluid compressor having a rotary shaft extending through an opening in the compressor casing, the combination of a sealing device for said shaft opening comprising an annular sealing chamber surrounding said shaft and an annular valve on said shaft rotating in said sealing chamber and adapted to seat against one end of the sealing chamber to form a closure for said shaft opening when the compressor is not running, said valve being held off of said seat when the compressor is running, mechanism which maintains a sealing liquid under pressure in said sealing chamber when the compressor is running, and a packing ring surrounding said shaft in an annular cavity communicating with said sealing chamber and located between the same and the impeller chamber of the compressor, said shaft being adapted to rotate in said packing ring and said ring having a sliding fit in said annular cavity whereby the ring can shift laterally in the cavity as the shaft rotates.

6. In a fluid compressor adapted to operate at a pressure below atmospheric pressure and having a rotary shaft extending through an opening in the compressor casing, the combination of a liquid sealing device for said shaft opening comprising an annular sealing chamber surrounding said shaft and an annular member which rotates with the shaft in said sealing chamber, means for supplying sealing liquid under pressure to said sealing chamber while the compressor is running, and a packing ring surrounding said shaft in an annular cavity communicating with said sealing chamber and located between the same and the pressure chamber of the compressor, said shaft being adapted to rotate in said packing ring and said ring having a loose fit in said annular cavity whereby the ring can shift laterally in the cavity as the shaft rotates.

7. In a fluid compressor adapted to operate at a pressure below atmospheric pressure and having a rotary shaft extending through an opening in the compressor casing, the combination of a sealing device for said shaft opening comprising an annular sealing chamber surrounding said shaft and an annular valve on said shaft rotating in said sealing chamber and adapted to seat against one end of the sealing chamber to form a closure for said shaft opening when the compressor is not running, said valve being held off of its seat when the compressor is running, mechanism which maintains a sealing liquid under pressure in said sealing chamber when the compressor is running, and a packing ring surrounding said shaft in an annular cavity communicating with said sealing chamber and located between the same and the pressure chamber of the compressor, said shaft being adapted to rotate in said packing ring and said ring having a loose fit in said annular cavity whereby the ring can shift laterally in the cavity as the shaft rotates.

8. In a fluid compressor having a rotary shaft extending through an opening in the compressor casing, the combination of a sealing device for said shaft opening comprising an annular sealing chamber surrounding said shaft and an annular valve on said shaft rotating in said sealing chamber and adapted to seat against one end of the sealing chamber to form a closure for said shaft opening when the compressor is not running, said valve seating in the direction in which end thrust acts on said shaft, means for holding said valve off of said seat against said end thrust when the compressor is running, mechanism which maintains a sealing liquid in said sealing chamber when the compressor is running, and a packing ring surrounding said shaft in an annular cavity which communicates with said sealing chamber and is located between the sealing chamber and the impeller chamber of the compressor, said shaft being adapted to rotate in said packing ring and said ring having a loose fit in said annular cavity whereby the ring can shift laterally in the cavity as the shaft rotates.

9. In a fluid compressor adapted to operate at a pressure below atmospheric pressure and having a rotary shaft extending through an opening in the compressor casing, the combination of a bearing for said shaft at the pressure end of the compressor located outwardly beyond said shaft opening, a liquid sealing device for said shaft opening located between said opening and said bearing and comprising an annular sealing chamber surrounding said shaft and communicating with said bearing, and a member which rotates with said shaft in said sealing chamber, means for maintaining a sealing liquid in said sealing chamber when the compressor is running, and a packing ring surrounding said shaft in an annular cavity communicating with said sealing chamber, said shaft being adapted to rotate in said packing ring and said ring having a loose fit in said annular cavity whereby the ring can shift laterally in the cavity as the shaft rotates.

10. In a fluid compressor having a rotary shaft extending through an opening in the compressor casing, the combination of a valve connected to the compressor shaft and a cooperating valve seat for closing said shaft opening, said shaft being movable axially to seat and unseat said valve, a disk on said shaft, a hollow piston in which said disk rotates, a chamber in which said piston is movable axially of said shaft, a valve which controls an opening in said hollow piston and is opened upon a predetermined movement of said piston, means acting when the compressor is in operation for supplying liquid under pressure to said cylinder to move said piston, and said liquid being adapted when said second mentioned valve opens to enter the piston and act on said disk to move said shaft to unseat said first mentioned valve, and means for seating said valve when the compressor is not in operation.

11. In a fluid compressor having a rotary shaft extending through an opening in the compressor casing, the combination of a valve and a cooperating valve seat for closing said shaft opening, said valve being movable toward and from its seat, a disk, a hollow member in which said disk rotates and which is movable for seating said valve, a valve which controls an opening in said hollow member and is opened upon a predetermined movement of said member, means acting when the compressor is in operation for producing fluid pressure against said member for moving the same, said fluid pressure being adapted when said second mentioned valve opens to enter the hollow member and act on said disk to unseat said first mentioned valve, and means for seating said valve when the compressor is not in operation.

12. In a fluid compressor having a rotary shaft extending through an opening in the compressor casing, the combination of a valve and valve seat which cooperate to form a closure for said shaft opening when the compressor is not running, a hollow member, a part arranged to move in said hollow member, means for producing fluid pressure against said member for moving said member in the direction to unseat said valve, a valve controlling the admission of said fluid pressure into said hollow member and arranged to open after an initial movement of said member, the pressure of the fluid in said hollow member on said part acting to hold said first mentioned valve off of its seat when the compressor is running, and means for seating said first mentioned valve when the compressor is not running.

13. In a fluid compressor having a rotary shaft extending through an opening in the compressor casing, the combination of a valve and valve seat which cooperate to form a closure for said shaft opening when the compressor is not running, said valve being unseated by an axial movement of said shaft, a hollow piston, a part on said shaft arranged to rotate in said hollow piston, a chamber in which said piston is movable axially of said shaft, means for supplying liquid under pressure to said chamber for moving said piston in the direction to unseat said valve, a valve controlling the admission of said liquid from said chamber into said hollow piston and arranged to open after an initial movement of said piston, the pressure of the liquid in said hollow piston on said part acting to hold said first mentioned valve off of its seat when the compressor is running, and means for moving said shaft to seat the first mentioned valve when the compressor is not running.

14. In a fluid compressor having a rotary shaft extending through an opening in the compressor casing, the combination of a valve and valve seat which cooperate to form a closure for said shaft opening when the compressor is not running, said valve being unseated by an axial movement of said shaft, a hollow piston, a disk secured to said shaft and arranged to rotate and having a limited axial movement in said hollow piston, a chamber in which said piston is movable axially of said shaft, means for supplying liquid under pressure to said chamber for moving said piston in the direction to unseat said valve, a valve controlling the admission of said liquid from said chamber into said hollow piston and arranged to open after a limited movement of said piston, the pressure of the liquid in said hollow piston acting on said disk to move said shaft to unseat said first mentioned valve, and means acting on said piston to move said shaft and seat said first mentioned valve when the compressor is not running.

15. In a fluid compressor having a rotary shaft extending through an opening in the compressor casing, the combination of a valve and valve seat which cooperate to form a closure for said shaft opening when the compressor is not running, said shaft being subject to end thrust in a direction to seat said valve, and mechanism for moving and holding said valve off of its seat and resisting said end thrust on the shaft when the compressor is running, comprising a hollow member which is movable, a part arranged to rotate in said hollow member, means for producing fluid pressure against said member to move said member in the direction to unseat said valve, and means for admitting said fluid pressure to said hollow member after a limited movement of said member whereby the fluid pressure acts between said member and said part to regulate the movement of the shaft by the end thrust thereon.

16. In a fluid compressor having a rotary shaft extending through an opening in the compressor casing, the combination of a valve and valve seat which cooperate to form a closure for said shaft opening when the compressor is not running, said compressor producing end thrust on said shaft in a direction to seat said valve, and mechanism for moving and holding said valve off of its seat and resisting said end thrust on the shaft when the compressor is running, comprising a hollow piston, a chamber in which said piston is movable axially of the shaft, a part on said shaft arranged to rotate in said hollow piston, means for producing liquid pressure in said chamber to move said piston in the direction to unseat said valve, and means for admitting said liquid pressure to said hollow piston after a limited movement of said piston whereby the liquid acts between said piston and said part of said shaft to regulate the movement of the shaft by the end thrust there on.

17. In a fluid compressor having a rotary shaft extending through an opening in the compressor casing, the combination of a valve and valve seat which cooperate to form a closure for said shaft opening when the compressor is not running, said shaft being subject to end thrust in a direction to seat said valve, and mechanism for moving and holding said valve off of its seat and resisting said end thrust on the shaft when the compressor is running, comprising a hollow piston, a chamber in which said piston is movable axially of the shaft, a part on said shaft arranged to rotate in said hollow piston, means for producing liquid pressure in said chamber to move said piston in the direction to unseat said valve, means for admitting said liquid pressure to said hollow piston after a limited movement of said piston whereby the liquid acts between said piston and said part of said shaft to regulate the movement of the shaft by the end thrust thereon, and means acting on said piston to move said shaft to seat said valve.

18. In a fluid compressor having a rotary shaft extending through an opening in the compressor casing, the combination of a valve and valve seat which cooperate to form a closure for said shaft opening when the compressor is not running, said shaft being subject to end thrust in a direction to seat said valve, and mechanism for moving and holding said valve off of its seat and resisting said end thrust on the shaft when the compressor is running, comprising a hollow member which is movable, a part arranged to rotate in said hollow member, means for producing fluid pressure against said member to move said member in the direction to unseat said valve, means for admitting said fluid pressure to said hollow member after a limited movement of said piston whereby the pressure acts between said member and said part to regulate the movement of the shaft by the end thrust thereon, and means permitting a regulated escape of the pressure fluid from said hollow member.

19. In a fluid compressor having a rotary shaft extending through an opening in the compressor casing, the combination of a valve and valve seat which cooperate to form a closure for said shaft opening when the compressor is not running, said shaft being subject to end thrust in a direction to seat said valve, and mechanism for moving and holding said valve off of its seat and resisting said end thrust on the shaft when the compressor is running, comprising a hollow member which is movable axially of the shaft, a part on said shaft arranged to rotate in said hollow member, means for producing liquid pressure against said member to move said member in the direction to unseat said valve, means for admitting said liquid pressure into said hollow member after a limited movement of said member whereby the liquid acts between said hollow member and said part of said shaft to regulate the movement of the shaft by the end thrust thereon, said hollow member having a hole in its upper portion through which a regulated escape of the pressure liquid from said hollow member is permitted.

20. In a fluid compressor having a rotary shaft extending through an opening in the compressor casing, the combination of a valve and valve seat which cooperate to form a closure for said shaft opening when the compressor is not running, said shaft being subject to end thrust in a direction to seat said valve, and mechanism for moving and holding said valve off of its seat and resisting said end thrust on the shaft when the compressor is running comprising a hollow piston, a chamber in which said piston is movable axially of the shaft and which communicates at one side of said piston with a low pressure portion of the compressor, a part on said shaft arranged to rotate in said hollow piston, means for producing liquid pressure in said chamber at the other side of said piston to move said piston in the direction in which said valve moves away from its seat, and means for admitting said liquid pressure to said hollow piston after a limited movement of said piston whereby the liquid acts between said piston and said part of said shaft to regulate the movement of the shaft by the end thrust on said shaft.

WILLIS H. CARRIER.